US008386876B2

(12) United States Patent
Khoshnevis et al.

(10) Patent No.: US 8,386,876 B2
(45) Date of Patent: Feb. 26, 2013

(54) TRANSMISSION OF DIFFERENT REDUNDANCY VERSIONS ON DIFFERENT DEGREES OF FREEDOM

(75) Inventors: Ahmad Khoshnevis, Portland, OR (US); Sayantan Choudhury, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 775 days.

(21) Appl. No.: 12/541,847

(22) Filed: Aug. 14, 2009

(65) Prior Publication Data

US 2011/0041021 A1 Feb. 17, 2011

(51) Int. Cl.
*H03M 13/00* (2006.01)
*H04L 1/14* (2006.01)

(52) U.S. Cl. ........................................ 714/751; 714/750

(58) Field of Classification Search ........................ None
See application file for complete search history.

(56) References Cited

U.S. PATENT DOCUMENTS

2004/0192204 A1* 9/2004 Periyalwar et al. ............. 455/25
2005/0020313 A1* 1/2005 Chae et al. ................. 455/562.1
2005/0037718 A1* 2/2005 Kim et al. ..................... 455/101
2006/0039299 A1* 2/2006 Ihm et al. ...................... 370/254
2006/0104242 A1* 5/2006 Kim et al. ..................... 370/329
2007/0070954 A1* 3/2007 Kim et al. ..................... 370/334
2007/0153672 A1* 7/2007 Terry et al. .................... 370/206
2007/0230516 A1* 10/2007 Torsner et al. ................ 370/538
2007/0255993 A1* 11/2007 Yap et al. ...................... 714/748
2008/0160912 A1* 7/2008 Kim et al. ....................... 455/15
2009/0109892 A1* 4/2009 Oyman et al. ................ 370/315
2009/0254790 A1* 10/2009 Pi et al. ......................... 714/749
2009/0313516 A1* 12/2009 Shin et al. ..................... 714/748
2010/0008294 A1* 1/2010 Palanki et al. ................ 370/328
2010/0031117 A1* 2/2010 Lee et al. ...................... 714/752
2010/0050034 A1* 2/2010 Che et al. ...................... 714/748
2010/0103834 A1* 4/2010 Gorokhov et al. ............ 370/252
2010/0115358 A1* 5/2010 Kotecha et al. ............... 714/748

(Continued)

FOREIGN PATENT DOCUMENTS

WO 2006/046894 5/2006
WO 2007/045101 4/2007

(Continued)

OTHER PUBLICATIONS

Kian Chung Beh; Doufexi, A.; Armour, S.; , "Performance Evaluation of Hybrid ARQ Schemes of 3GPP LTE OFDMA System," Personal, Indoor and Mobile Radio Communications, 2007. PIMRC 2007. IEEE 18th International Symposium on , vol., No., pp. 1-5, Sep. 3-7, 2007.*

(Continued)

*Primary Examiner* — Ajay Bhatia
*Assistant Examiner* — Daniel McMahon
(74) *Attorney, Agent, or Firm* — Austin Rapp & Hardman

(57) ABSTRACT

For downlink cooperative multi-point (CoMP) communication, each cooperating transmission point (e.g., base station) may send a retransmission packet with a different redundancy version to a user equipment (UE). Mechanisms may be provided to determine which transmission point should send packets with which redundancy version. For uplink CoMP, in order to reduce the backhaul overhead, each cooperating base station may share only a fraction of the retransmitted packet with the serving base station. Also, different retransmission packets with different redundancy versions can be transmitted to different cooperating base stations using spatial degrees of freedom.

35 Claims, 16 Drawing Sheets

U.S. PATENT DOCUMENTS

| | | | | |
|---|---|---|---|---|
| 2010/0118777 | A1* | 5/2010 | Yamada et al. | 370/328 |
| 2011/0035639 | A1* | 2/2011 | Earnshaw et al. | 714/748 |
| 2011/0317637 | A1* | 12/2011 | Kim et al. | 370/329 |

FOREIGN PATENT DOCUMENTS

| | | |
|---|---|---|
| WO | 2008/108527 | 9/2008 |
| WO | 2009/022872 | 2/2009 |

OTHER PUBLICATIONS

Motorola, "HARQ Termination Point for CoMP Joint-Transmission," 3GPP TSG-RAN-WG2 Meeting #65bis, R2-092358, Mar. 2009.
International Search Report issued for International Patent Application No. PCT/JP2010/063438 on Nov. 16, 2010.
3GPP TS 36.212 V8.6.0, "Evolved Universal Terrestrial Radio Access (E-UTRA) Multiplexing and channel coding," Mar. 2009.
3GPP TS 36.300 V8.1.0, "Evolved Universal Terrestrial Radio Access (E-UTRA) and Evolved Universal Terrestrial Radio Access Network (E-Utran); Overall description," Jun. 2007.
3GPP TS 36.211 V8.6.0, "Evolved Universal Terrestrial Radio Access (E-UTRA) Physical Channels and Modulation," Mar. 2009.
Alcatel-Lucent Shanghai Bell, Alcatel-Lucent, "Efficient Uplink Coordinated Multi-Point Reception with Reduced Backhauling Cost," R1-092315, Jun. 2009.
Fujitsu, "Efficient HARQ Protocol for SIC based DL CoMP," R1-092431, Jun. 2009.
3GPP TS 45.005 V8.5.0, "Technical Specification Group GSM/EDGE Radio Accedd Network; Radio Transmission and Reception," May 2009.
Research in Motion, UK Limited, "Relay Link HARQ Operation," R1-092421, Jun. 2009.
LG Electronics Inc., "Subframe Allocation for Backhaul HARQ Operation," R1-092493, Jun. 2009.
InterDigital, "FDD Relay Type I Backhaul Interference and HARQ Issues," R1-092587, Jun. 2009.
Qualcomm Europe, "Backhaul Link Design in Support of Relaying Operation," R1-092702, Jun. 2009.

* cited by examiner

| Base Station 312 | Cell ID 522 | Ranking 524 | RV 320 |
|---|---|---|---|
| 2nd BS | 4 | 1 | rv=2 |
| 1st (Serving) BS | 17 | 2 | rv=1 |
| 3rd BS | 23 | 3 | rv=2 |

FIG. 5

TRANSMISSION OF DIFFERENT REDUNDANCY VERSIONS ON DIFFERENT DEGREES OF FREEDOM

TECHNICAL FIELD

The present disclosure relates generally to wireless communications. More specifically, the present disclosure relates to coordinated multipoint transmission in a cellular network.

BACKGROUND

A cellular network is a radio network made up of a number of radio cells (or just cells) each served by a fixed transmitter, known as a cell site or base station. These cells are used to cover different areas in order to provide radio coverage over a wider area than the area of one cell. Cellular networks include a set of fixed main transceivers each serving a cell and a set of distributed transceivers (which are generally, but not always, mobile) that provide services to the network's users.

There are a number of standards organizations that attempt to develop standards for cellular networks. One example of such a standards organization is the 3rd Generation Partnership Project (3GPP). 3GPP LTE (Long Term Evolution) is the name given to a project within 3GPP to improve the Universal Mobile Telecommunications System (UMTS) standard to cope with future technology evolutions. 3GPP LTE Advanced is currently being standardized by 3GPP as an enhancement of 3GPP LTE.

Coordinated multiple point transmission/reception (CoMP) is considered one of the promising technologies to improve the performance of 3GPP LTE Advanced. One implementation of CoMP is to transmit the information from multiple base stations to a user equipment (UE) resulting in better signal quality at the UE due to the combining capability of the multiple transmissions at the UE.

When an error is detected in a packet, a Negative Acknowledgement (NACK) may be sent back informing the transmitter(s) about the error. Upon receiving the NACK, the transmitter(s) may resend the packet. The retransmitted packet may be combined with the initial transmission at the receiver and may be decoded. If an error is not detected, an Acknowledgement (ACK) may be sent back. Otherwise, another NACK may be sent back and the process may be repeated until the packet is decoded without an error, or the maximum number of retransmission attempts (e.g., as specified in the standard) is reached.

For a retransmission, the transmitter(s) can resend exactly the same packet as in the original transmission. Alternatively, the transmitter(s) can send different versions of the packet. These different versions are indicated by a Redundancy Version (rv) parameter in Release 8 (LTE).

BRIEF DESCRIPTION OF THE DRAWINGS

FIG. 5 illustrates information that may be determined by a base station for purposes of determining which redundancy version should be transmitted by the base station;

DETAILED DESCRIPTION

Figure 1:
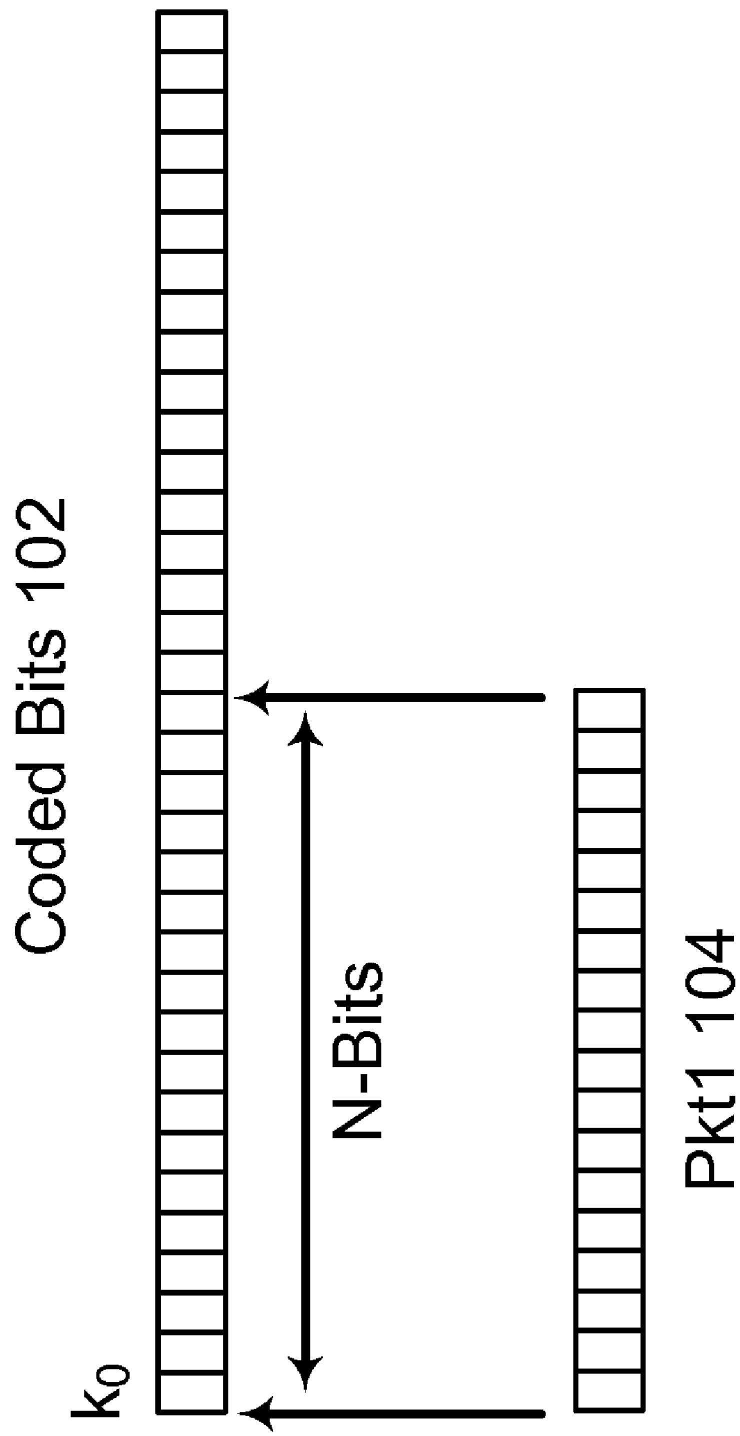
FIG. 1 illustrates certain aspects of the general concept of Hybrid Automatic Repeat Request (HARQ) in an LTE system.

A method for retransmission of information is disclosed. A first redundancy version of a retransmission packet is sent to a user equipment on a first degree of freedom. The first degree of freedom is different than at least one other degree of freedom on which at least one other redundancy version of the retransmission packet is sent to the user equipment.

Different degrees of freedom may be obtained from at least one of time, frequency, spatial layers, and codes. In some implementations, different degrees of freedom may be obtained from different transmission points. In some implementations, at least one degree of freedom may combine resources of different transmission points.

The method may be implemented by a serving base station. The serving base station may indicate to at least one other transmission point which redundancy version should be transmitted and which resource allocation blocks should be used via signaling messages. In some implementations, the signaling messages may be control signaling messages that are exchanged between the serving base station and the at least one other transmission point on a dynamic basis. In some implementations, the signaling messages may be higher layer signaling messages that are exchanged between the serving base station and the at least one other transmission point during initial setup of coordinated multi-point communication.

In some implementations, the indication of which redundancy version should be transmitted and which resource allocation blocks should be used may occur at the time of retransmission. In some implementations, the indication of which redundancy version should be transmitted and which resource allocation blocks should be used may occur in a time varying manner. The redundancy version that should be transmitted may be determined using implicit information.

The method may be implemented by a serving base station. The serving base station may select a subset of transmission points that are participating in coordinated multi-point communication to take part in retransmission.

The method may be implemented by a transmission point that includes multiple antennas. The first redundancy version may be transmitted on a different spatial layer than the at least one other redundancy version. In some implementations, the layer-to-redundancy version mapping may be statically assigned. In some implementations, the layer-to-redundancy version mapping may be semi-statically assigned during initial setup of coordinated multi-point communication. The method may also include notifying the user equipment about redundancy versions and resources that are being used via a downlink control channel.

The first redundancy version may be transmitted on a different spatial layer than the at least one other redundancy version. The method may also include signaling to the user equipment which spatial layer is transmitting which redundancy version.

The number of transmission points that are participating in coordinated multi-point communication may exceed the number of spatial layers. The redundancy version may be selected using k mod L, where k is a transmission point's ranking and L is the number of available spatial layers.

The method may be implemented by a serving base station. The serving base station may receive feedback reports from the UE, and choose transmission points and redundancy versions that have the highest probability of successful retransmission based on the feedback reports. The feedback reports may include the user equipment's preferences regarding the transmission points and the redundancy versions.

The method may also include sending a first redundancy version of an original transmission packet to the user equipment on a different degree of freedom than at least one other redundancy version of the original transmission packet.

A method for retransmission of information for uplink cooperative multi-point communication is also disclosed. A serving base station receives a packet from a user equipment. The serving base station determines that the serving base station is unable to decode the packet. The serving base station receives a first part of the packet from a first cooperating base station via a first backhaul connection. The serving base station receives a second part of the packet from a second cooperating reception point via a second backhaul connection. The first part of the packet may have the same redundancy version as the second part of the packet. Alternatively, the first part of the packet may have a different redundancy version than the second part of the packet.

A method for transmission of information for uplink cooperative multi-point communication is also disclosed. The method includes transmitting a packet to each of multiple cooperating reception points. The method also includes transmitting different retransmission packets with different redundancy versions to different cooperating reception points using spatial degrees of freedom. Additional information may be encoded using superposition coding such that a reception point with a better channel can access additional parity bits. The method may be implemented by a user equipment, and the reception points may be base stations.

A transmission point that is configured for retransmission of information is disclosed. The transmission point includes a processor and memory in electronic communication with the processor. Instructions are stored in memory. The instructions are executable to send a first redundancy version of a retransmission packet to a user equipment on a first degree of freedom. The first degree of freedom is different than at least one other degree of freedom on which at least one other redundancy version of the retransmission packet is sent to the user equipment.

A serving base station that is configured for retransmission of information for uplink cooperative multi-point communication is disclosed. The serving base station includes a processor and memory in electronic communication with the processor. Instructions are stored in memory. The instructions are executable to receive a packet from a user equipment, determine that the serving base station is unable to decode the packet, receive a first part of the packet from a first cooperating base station via a first backhaul connection, and receive a second part of the packet from a second cooperating reception point via a second backhaul connection.

An apparatus for transmission of information for uplink cooperative multi-point communication is disclosed. The apparatus includes a processor and memory in electronic communication with the processor. Instructions are stored in memory. The instructions are executable to transmit a packet to each of multiple cooperating reception points, and transmit different retransmission packets with different redundancy versions to different cooperating reception points using spatial degrees of freedom.

As discussed above, the methods disclosed herein may be applied in a CoMP setting. An example of a CoMP setting is where multiple base stations are cooperating with each other in transmitting information to a user equipment (UE). The methods disclosed may be applied in connection with the operation of Hybrid Automatic Repeat Request (HARQ) in a CoMP setting (e.g., when an error is detected at the UE and a retransmission is in order).

For purposes of example, the methods disclosed herein will be described in terms of a 3GPP LTE-like system, such as 3GPP LTE, 3GPP LTE-Advanced, etc. However, the scope of the disclosed methods should not be limited in this regard. The methods disclosed herein may also be implemented in other types of wireless communication systems.

As used herein, the term "user equipment" refers to an electronic device that may be used for voice and/or data communication over a wireless communication system. Examples of user equipment include cellular phones, personal digital assistants (PDAs), wireless modems, laptop computers, etc. A user equipment may alternatively be referred to as a mobile station, an access terminal, a mobile terminal, a subscriber station, a remote station, a user terminal, a terminal, a subscriber unit, a mobile device, a wireless device, or some other terminology.

The term "base station" refers to a wireless communication station that is installed at a fixed location and that is used to communicate with user equipment. A base station may alternatively be referred to as an access point, a Node B, an evolved Node B (eNB), or some other similar terminology.

A user equipment may communicate with one or more base stations via transmissions on the uplink and the downlink. The uplink (or reverse link) refers to the communication link from the user equipment to the base station, and the downlink (or forward link) refers to the communication link from the base station to the user equipment.

Figure 2:
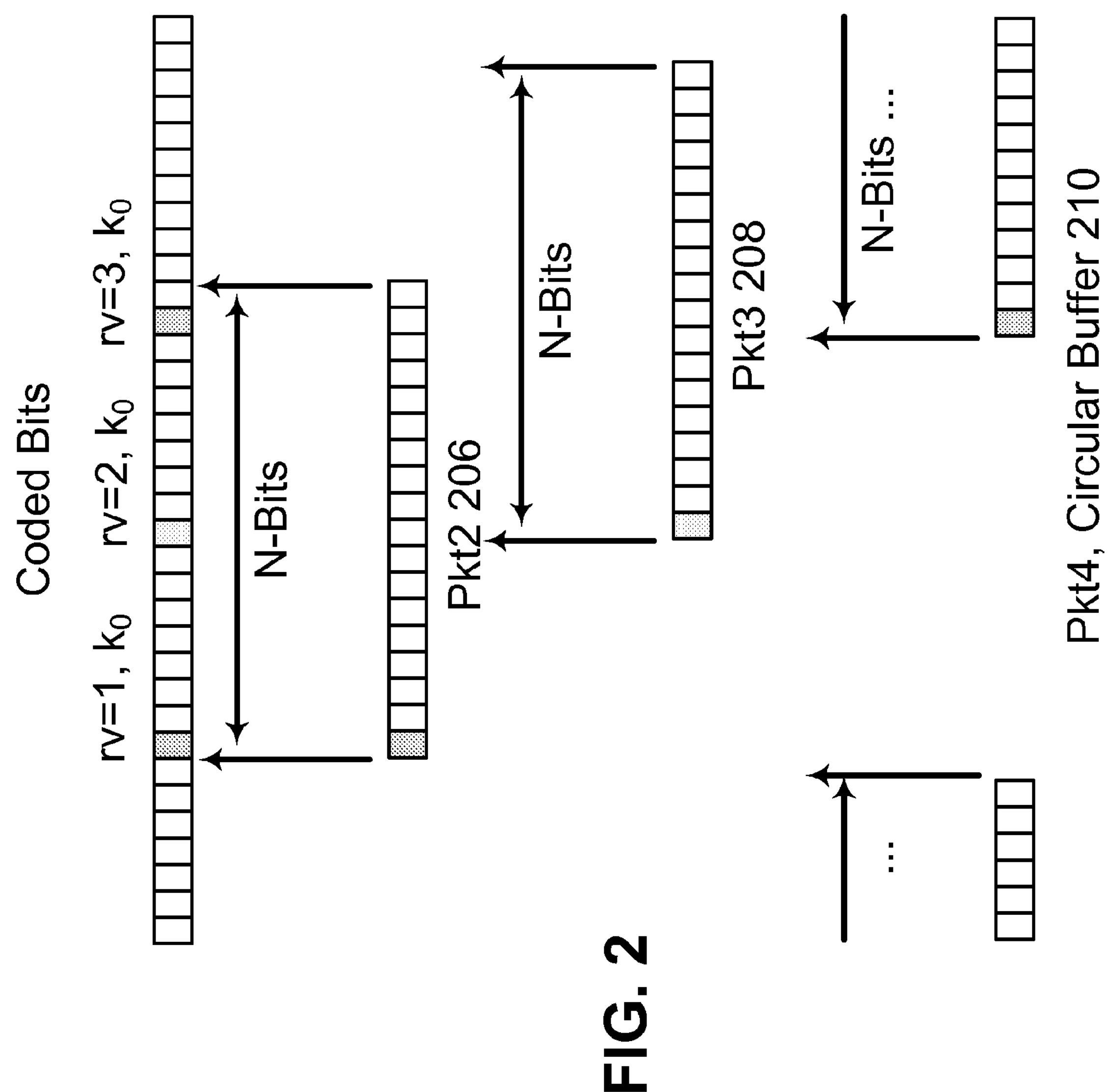
FIG. 2 illustrates certain additional aspects of the general concept of HARQ in an LTE system.

Initially, a description will be provided about the general concept of HARQ in LTE Release 8. Reference is made to FIGS. 1 and 2. Uncoded bits may be coded using a mother encoder, using turbo code rate ⅓ as an example. However, all the coded bits 102 may not be transmitted. Through a "bit selection" process, a subset of coded bits 102 may be selected for transmission. The selection process may be as follows. First, all the bits may be interleaved and shuffled to generate a long packet of coded bits 102, which may also be referred to as a coded bit stream 102. Then, starting from location $k_0=0$ (the beginning of the stream 102), N bits may be selected to form the initial transmitted packet denoted by Pkt1 104 in FIG. 1.

If the packet 104 is received correctly at the destination, a short acknowledgement packet (ACK) may be sent back to the transmitter(s) indicating the successful transmission of the packet. Otherwise, a negative ACK (NACK) may be sent back. When a NACK is received by the transmitter(s), in accordance with a hybrid automatic repeat request (HARQ) process, the packet may be resent. A redundancy version (rv) parameter may be assigned to the retransmitted packet. If rv=0, this may indicate that Pkt1 104 is retransmitted. The redundancy version parameter can take three other values: 1, 2, and 3. Each value may be associated with a starting location on the original coded bit stream 102. FIG. 2 illustrates retransmission packets generated by different redundancy versions, namely Pkt2 206 corresponding to rv=1, Pkt3 208 corresponding to rv=2, and Pkt4 210 corresponding to rv=3.

Figure 3:
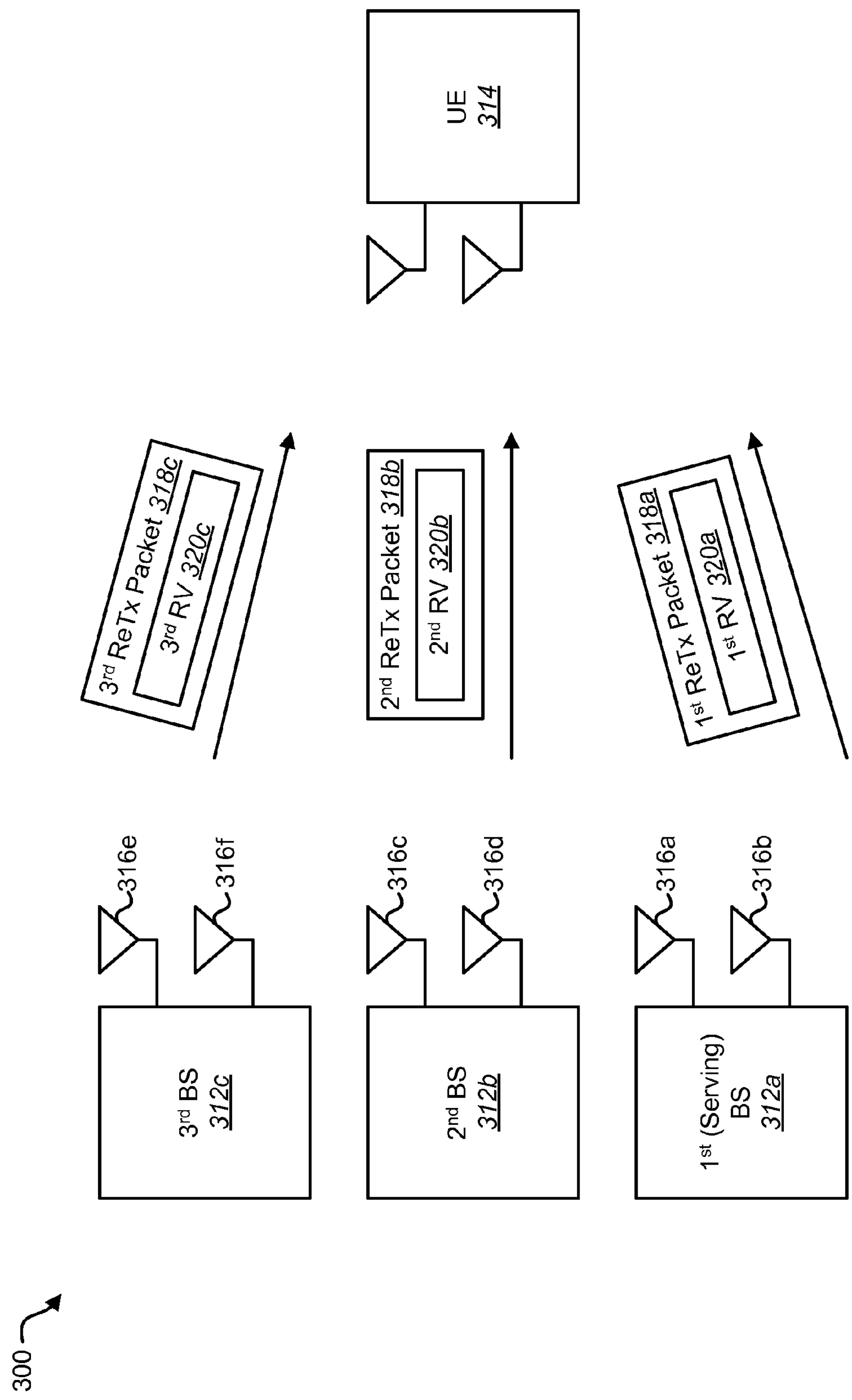
FIG. 3 illustrates a system in which multiple cooperating base stations send retransmission packets to a user equipment (UE)

Reference is now made to FIG. 3, which illustrates a system 300 in which at least some of the methods disclosed herein may be utilized. A first base station 312*a*, a second base station 312*b*, and a third base station 312*c* may be participating in downlink CoMP, i.e., they are coordinating their transmissions to a UE 314. The first base station 312*a* may be the serving base station 312*a*. In other words, the first base station 312*a* may be responsible for maintaining the connection with the UE 314. Each base station 312 may include multiple Tx antennas 316. In particular, the serving BS 312*a* may include first and second Tx antennas 316*a*, 316*b*. The second BS 312*b* may include first and second Tx antennas 316*c*, 316*d*. The third BS 312*c* may include first and second Tx antennas 316*e*, 316*f*. The remaining items shown in FIG. 3 will be discussed below in connection with FIG. 4.

For downlink CoMP, retransmission methods may be applicable when resources are available for retransmission of different rvs from different base stations. In this context resources are referred to as Time, Frequency and Spatial Layer. In this context, "spatial layer" (or simply "layer") is the term used in LTE for the different streams generated by spatial multiplexing. A layer can be described as a mapping of symbols onto the transmit antenna ports. Each layer may be identified by a (preceding) vector of size equal to the number of transmit antenna ports and can be associated with a radiation pattern.

Figure 4:
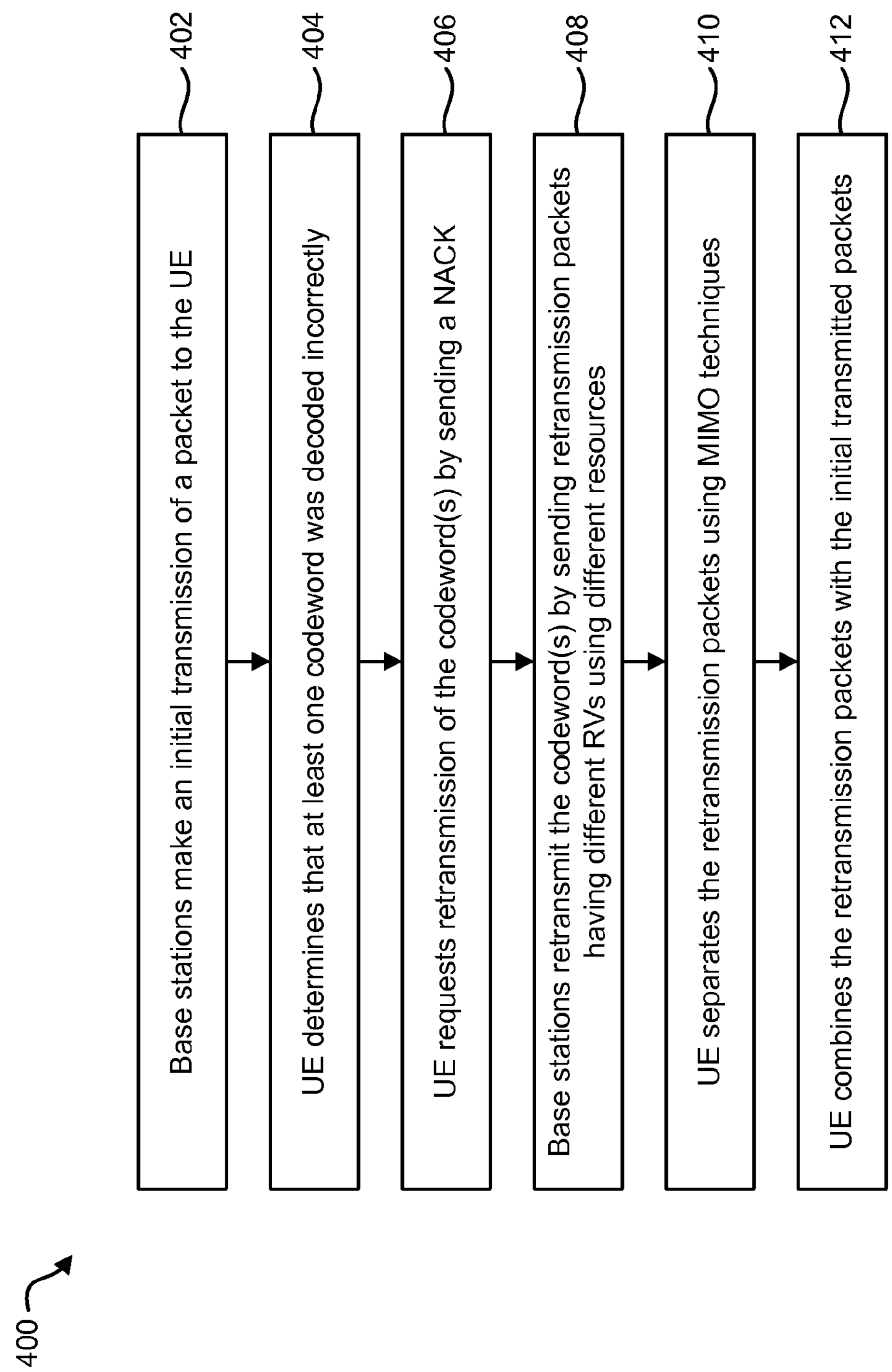
FIG. 4 illustrates a method that may be performed by the multiple cooperating base stations and the UE in the system of FIG. 3.

A typical scenario is illustrated in the method 400 of FIG. 4. For purposes of example, this method 400 will be discussed in connection with the system 300 of FIG. 3. The base stations 312*a*, 312*b*, 312*c* that are participating in downlink CoMP may make 402 an initial transmission of a packet to the UE 314. The initial transmission may be a rank one transmission or a multiple rank transmission.

The UE 314 may determine 404 that at least one codeword (but fewer than all of the codewords) was decoded incorrectly. In this context, the term "codeword" may refer to an independently encoded data block, corresponding to a single Transport Block (TB) delivered from the Medium Access Control (MAC) layer in the transmitter to the physical layer, and protected with a cyclic redundancy check (CRC). The UE 314 may request 406 retransmission of the codeword(s) by sending a NACK. The base stations 312*a*, 312*b*, 312*c* may retransmit the codeword(s) through multiple layers by using different redundancy versions 320*a*, 320*b*, 320*c*. More specifically, the base stations 312*a*, 312*b*, 312*c* may retransmit the codeword(s) by sending 408 retransmission packets 318*a*, 318*b*, 318*c*. The retransmission packets 318*a*, 318*b*, 318*c* may convey the same information bits as the initial transmission, but they are not necessarily the same bits as the initial transmission. The redundancy version 320*a* of the retransmission packet 318*a* sent by the serving base station 312*a* may be different than the redundancy version 320*b* of the retransmission packet 318*b* sent by the second base station 312*b*, which may be different than the redundancy version 320*c* of the retransmission packet 318*c* sent by the third base station 312*c*.

Also, the different redundancy versions 320*a*, 320*b*, 320*c* in the different retransmission packets 318*a*, 318*b*, 318*c* may be sent 408 using different resources (e.g., time, frequency, space, code, combination of these, etc.). More specifically, different redundancy versions 320*a*, 320*b*, 320*c* can be transmitted by allocating different resources to each of the redundancy versions 320*a*, 320*b*, 320*c*. For instance, a first cooperating base station 312*a* can transmit one redundancy version 320*a* at a first time instant, a second cooperating base station 312*b* can transmit a second redundancy version 320*b* at another time instant, and a third cooperating base station 312*c* can transmit a third redundancy version 320*c* at a third time instant. Alternatively, multiple cooperating base stations 312*a*, 312*b*, 312*c* could transmit different redundancy versions 320*a*, 320*b*, 320*c* at the same time using different frequency resources. One could also use different codes to separate different redundancy versions 320*a*, 320*b*, 320*c* on the same time-frequency resource.

The different redundancy versions 320 for the retransmission packets 318 could be sent on different spatial layers in a MIMO transmission mode. To take a simple example involving two transmission points, consider a 2×2 MIMO system with 2 spatial layers. In this example, one redundancy version 320 may be sent on layer 1, and the other redundancy version 320 may be sent on layer 2. Each transmission point could have an independent spatial layer (e.g., transmission point 1 transmits on layer 1 while transmission point 2 transmits on layer 2) or multiple transmission points could jointly form one spatial layer (e.g., transmission points 1 and 2 jointly form layer 1 and layer 2 and transmit different redundancy versions 320 on them). This is quite different from current retransmission schemes where the retransmissions transmit only one redundancy version 320 using all the spatial layers.

In order to combine the different redundancy versions 320 with previous redundancy versions 320, the UE 314 should be able to distinguish the different redundancy versions 320. Hence, the different redundancy versions 320 should be transmitted on different degrees of freedom. In this context, the phrase "different degree of freedom" refers to a mechanism for separating one redundancy version of a retransmission packet from another redundancy version of the retransmission packet. For example, different redundancy versions of a retransmission packet may be separated using time, frequency, spatial layer, codes, etc. The different degrees of freedom may be obtained from different transmission points. For example, a first redundancy version 320*a* may be sent on a first layer from the first base station 312*a*, and a second redundancy version 320*b* may be sent on a second layer from the second base station 312*b*. Alternatively, each degree of freedom may combine resources of different transmission points. For example, both the first and second spatial layers may be obtained from the combined channel from the first and second base stations 312*a*, 312*b*. Alternatively still, combinations of the above may be used. For example, some of the degrees of freedom may be obtained from different transmission points, and some of the degrees of freedom may combine resources of different transmission points.

The UE 314 may separate 410 the retransmission packets 318*a*, 318*b*, 318*c* using multiple-input, multiple-output (MIMO) techniques, such as Minimum Mean Squared Error (MMSE). The UE 314 may also combine 412 the retransmission packets 318*a*, 318*b*, 318*c* with the initial transmitted packets.

Several examples of mechanisms by which a base station 312 may determine which redundancy version 320 and/or which resources to use for sending the retransmission packets 318*a*, 318*b*, 318*c* will now be described. Such mechanisms may be referred to as providing an "ordering" for the cooperating base stations 312*a*, 312*b*, 312*c*.

Figure 6:
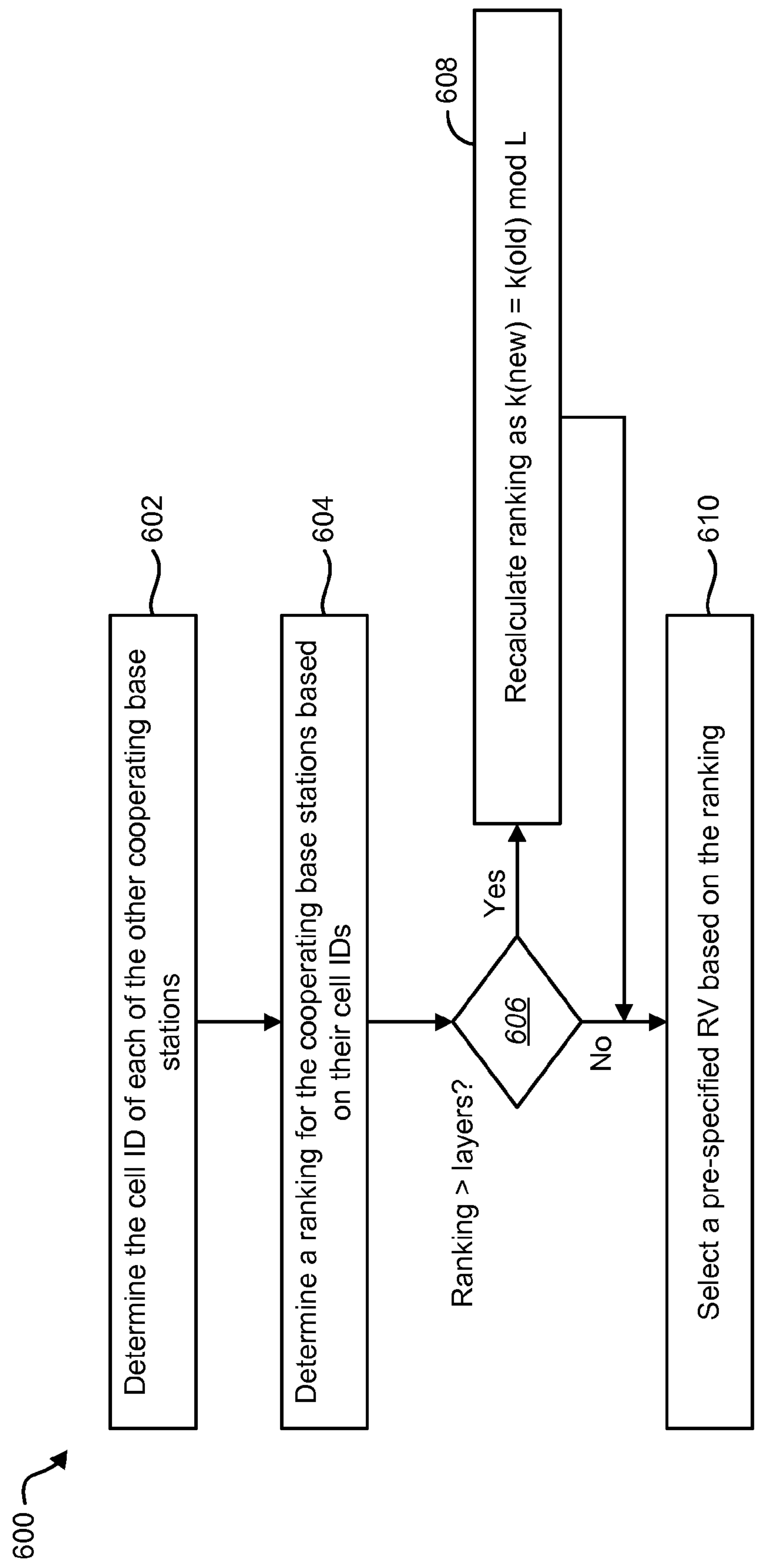
FIG. 6 illustrates a method for providing an ordering for the cooperating base stations for purposes of determining which redundancy versions should be transmitted.

Reference is now made to FIGS. 5 and 6, which illustrates one possible way to provide an ordering for the cooperating base stations 312*a*, 312*b*, 312*c* via implicit information. As shown in the method 600 of FIG. 6, each base station 312 may determine 602 the cell identifier (ID) 522 of each of the other cooperating base stations 312. For example, the serving base station 312*a* may determine 602 the cell IDs 522 of the second base station 312*b* and the third base station 312*c* during initial CoMP setup. The second base station 312*b* may receive the cell IDs 522 of the serving base station 312*a* and the third base station 312*c* from the serving base station 312*a*. Similarly, the third base station 312*c* may receive the cell IDs 522 of the serving base station 312*a* and the second base station 312*b* from the serving base station 312*a*.

Each base station 312 may determine 604 a ranking 524 for the cooperating base stations 312*a*, 312*b*, 312*c* based on their cell IDs 522. For example, suppose that the serving base station 312*a* has cell ID=17, the second base station 312*b* has cell ID=4, and the third base station 312*c* has cell ID=23. In this example, the second base station 312*b* may be ranked first, the serving base station 312*a* may be ranked second, and the third base station 312*c* may be ranked third.

Each base station 312 may select 610 a pre-specified redundancy version 320 based on its ranking 524. For example, the base station 312 that is ranked first (i.e., the second base station 312*b* in this example) may choose rv=2, the base station 312 that is ranked second (i.e., the serving base station 312*a* in this example) may choose rv=1, and the base station 312 that is ranked third (i.e., the third base station 312*c* in this example) may also choose rv=2. Thus, all that is needed is a mapping between the ranking 524 and the redundancy version 320.

The maximum number of redundancy versions 320 that can be used may be limited by the number of spatial layers. In other words, the number of packets 318 with different redundancy versions 320 can be as many as the number of spatial layers. One way to limit the number of retransmissions to the number of layers is to limit the maximum value of the ranking 524 to the number of layers. A determination may be made 606 about whether any of the rankings 524 exceed the number of spatial layers (i.e., whether the number of cooperating base stations 312 exceeds the number of spatial layers). For each ranking 524 that exceeds the number of spatial layers, the ranking 524 may be recalculated 608 as k(new)=k(old) mod L, where k is the ranking 524 and L is the number of spatial layers. Then, to all base stations 312 with a given ranking 524, one redundancy version 320 may be assigned. In other words, rv=i(k) in {0, 1, 2, 3}.

Figure 7:
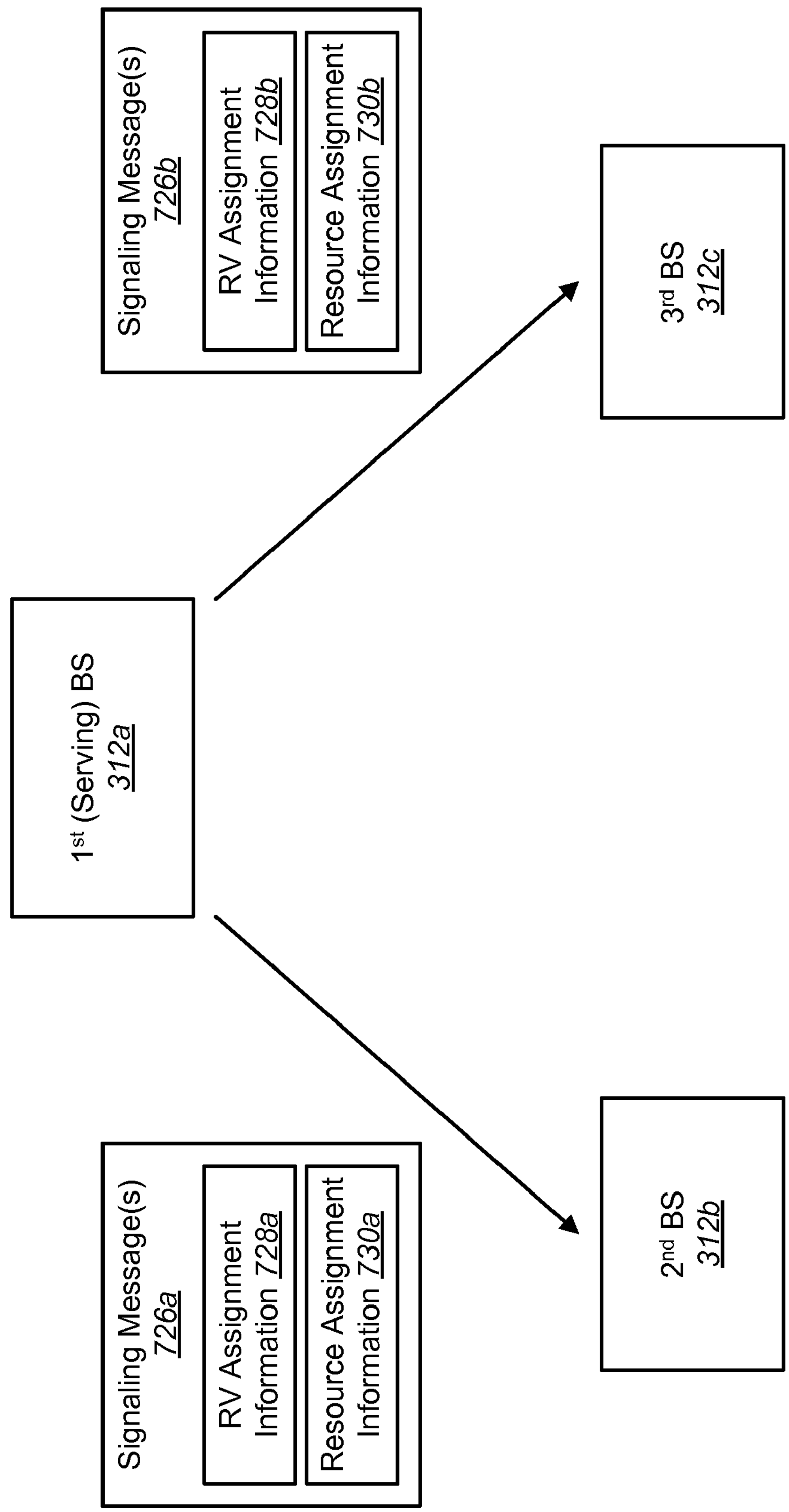
FIG. 7 illustrates signaling that may occur between a serving base station and other cooperating base stations.

Reference is now made to FIG. 7. The serving base station 312*a* can allocate an ordering number to each of the participating base stations 312*a*, 312*b*, 312*c*. This information can be transmitted via explicit ordering bits, sent to each of the other participating base stations 312*b*, 312*c*.

For example, the serving base station 312*a* may determine which redundancy version 320 and which resources each cooperating base station 312*a*, 312*b*, 312*c* should use for sending the retransmission packets 318*a*, 318*b*, 318*c*. These determinations may be made at the time of initial CoMP setup. Alternatively, these determinations may be made at the time of retransmission (i.e., at the time when the retransmission packets 318*a*, 318*b*, 318*c* are being sent).

The serving base station 312*a* may send RV assignment information 728 and resource assignment information 730 to the other cooperating base stations 312*b*, 312*c*. The resource assignment information 730 may indicate the resource allocation blocks (e.g., time, frequency, spatial layer, codes, etc.) to be used by the cooperating base stations 312*a*, 312*b*, 312*c* for the individual redundancy versions 320*a*, 320*b*, 320*c*.

The serving base station 312*a* may broadcast the RV assignment information 728 and the resource assignment information 730 to the other cooperating base stations 312*b*, 312*c*. Alternatively, the serving base station 312*a* may send this information 728, 730 to the other cooperating base stations 312*b*, 312*c* via non-broadcast messages. FIG. 7 shows the serving base station 312*a* sending signaling messages 726*a* to the second base station 312*b* that include RV assignment information 728*a* and resource assignment information 730*a*. FIG. 7 also shows the serving base station 312*a* sending signaling messages 726*b* to the third base station 312*c* that include RV assignment information 728*b* and resource assignment information 730*b*.

The signaling messages 726*a*, 726*b* may be higher-layer signaling messages that are sent on a semi-static basis during initial CoMP setup (i.e., during CoMP cell formation). Semi-static allocation may allow less flexibility in dynamically changing the resource allocation blocks and redundancy versions 320, but may reduce signaling overhead. Alternatively, the signaling messages 726*a*, 726*b* may be control signaling messages that are exchanged between the cooperating base stations 312*a*, 312*b*, 312*c* on a dynamic basis. The signaling messages 726*a*, 726*b* may be sent via a layer 2 procedure (i.e., the signaling messages 726*a*, 726*b* may involve layer 2 signaling).

In some implementations, there may not be an explicit signaling requirement. As an alternative to signaling, the redundancy version 320 to be used for the initial and subsequent retransmissions could be based on predefined patterns which can be defined statically or semi-statically during CoMP cell formation (e.g., $rv_i, rv_{i+1}, rv_{i+2}$) where $rv_i$ refers to the redundancy version 320 for the $i^{th}$ transmission (where i+1 is the $1^{st}$ retransmission, etc.).

Figure 8:
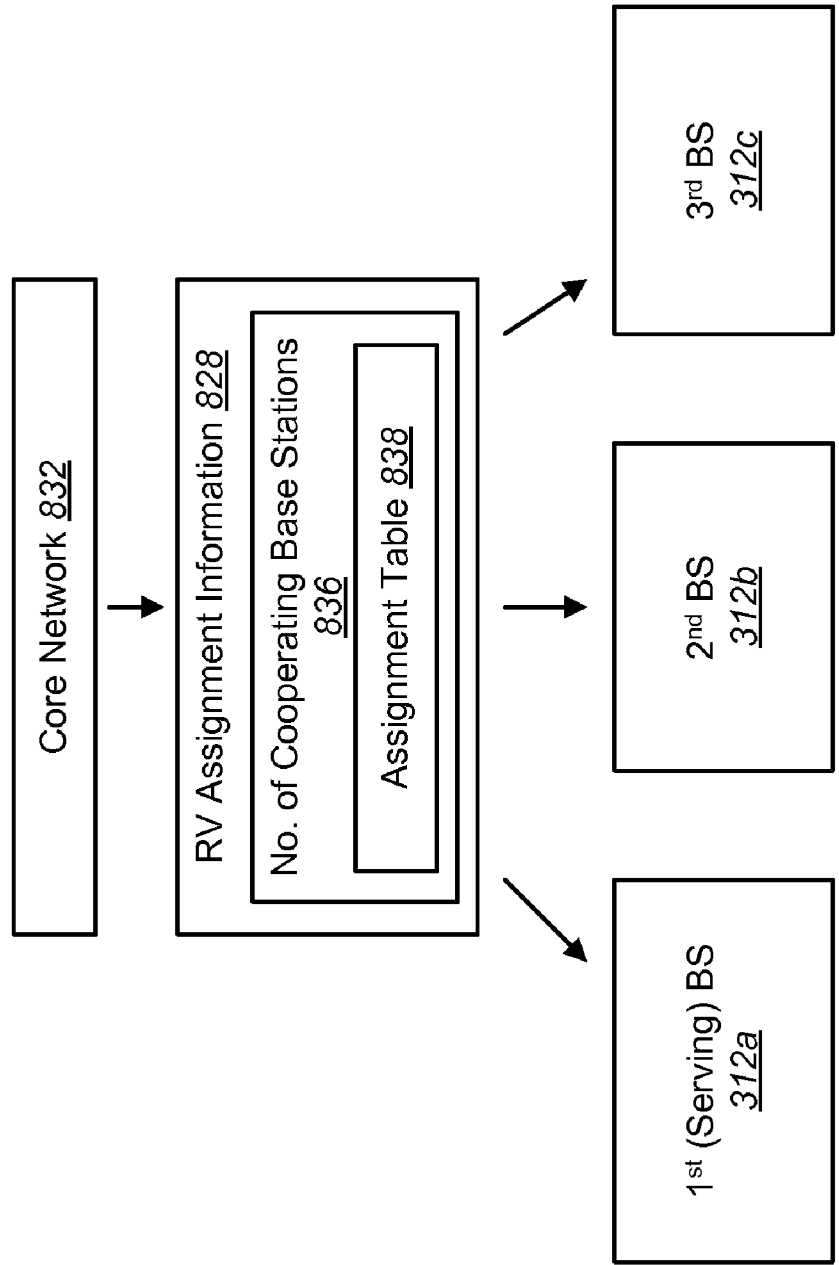
FIG. 8 illustrates a core network assigning redundancy versions to multiple cooperating base stations.

Reference is now made to FIG. 8. The core network 832 (i.e., layer 3 and above) may assign a redundancy version 320 to each participating base station 312*a*, 312*b*, 312*c*. FIG. 8 shows the core network 832 sending RV assignment information 828 to the cooperating base stations 312*a*, 312*b*, 312*c*. The assignment of the redundancy versions 320 may be dynamic, i.e., it may vary from transmission to transmission. Alternatively, the assignment of the redundancy versions 320 may be static. For example, the assignment of the redundancy versions 320 might be a function of the number 836 of participating base stations 312. That is, for a given number 836 of participating base stations 312, there may be a different assignment table 838.

Figure 9:
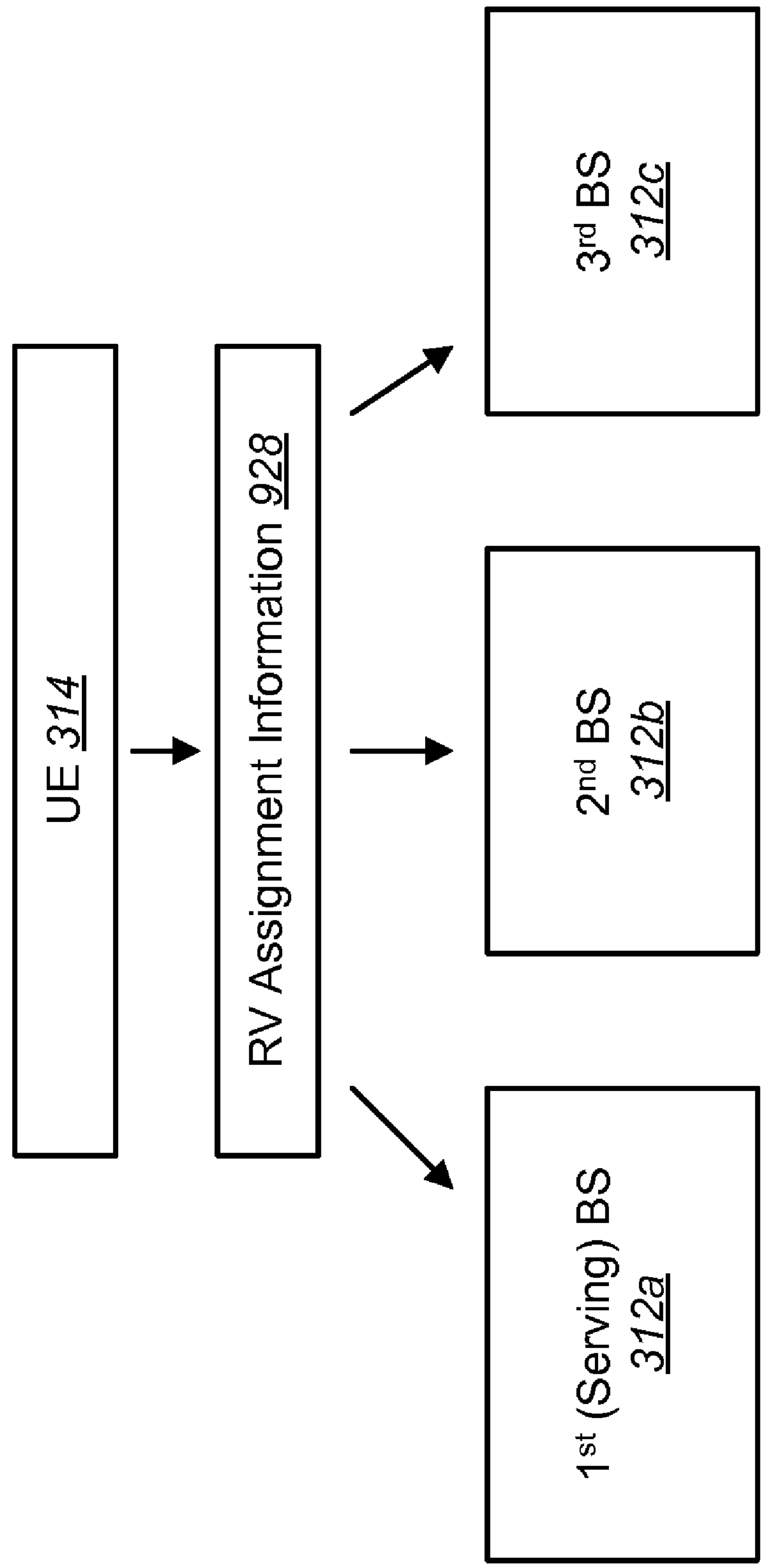
FIG. 9 illustrates a UE assigning redundancy versions to multiple cooperating base stations.

Reference is now made to FIG. 9. The assignment of the redundancy versions 320 might be made at the UE 314 and sent back to the base stations 312*a*, 312*b*, 312*c*. FIG. 9 shows the UE 314 sending RV assignment information 928 to the cooperating base stations 312*a*, 312*b*, 312*c*. However, the UE 314 may not always need to feed back the redundancy version 320 explicitly. If the transmission points (e.g., the base stations 312*a*, 312*b*, 312*c*) can estimate the channel based on the UE's 314 feedback, they may determine the redundancy version 320 autonomously. More specifically, if the transmission points can detect the UE's 314 feedback and/or the channel to the UE 314 from the transmission points based on explicit/implicit feedback, they may autonomously retransmit their codeword based on any of the possible redundancy versions 320 and indicate their choice to the serving base station 312*a*, which may in turn signal the UE 314.

Figure 10:
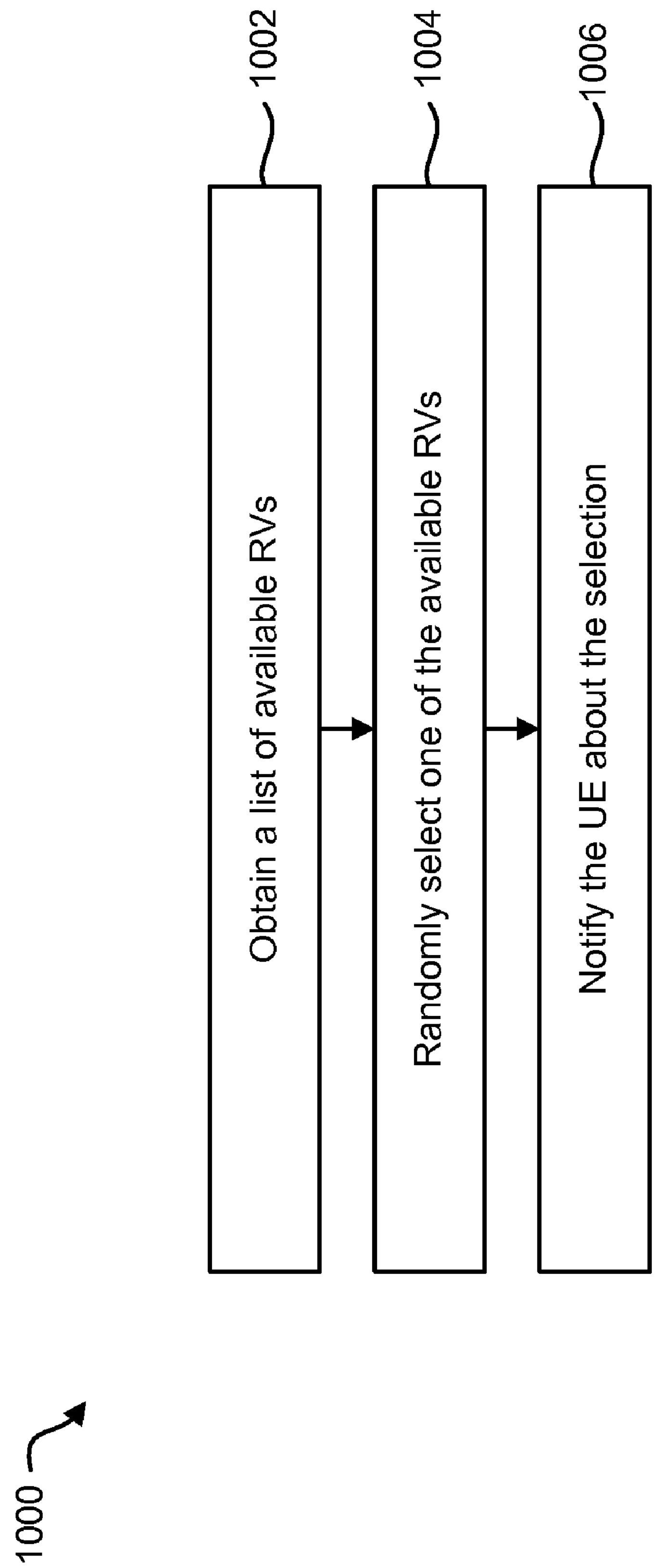
FIG. 10 illustrates another possible mechanism for multiple cooperating base stations to determine which redundancy versions should be transmitted.

Reference is now made to FIG. 10. Each base station 312 may obtain 1002 a list of available redundancy versions 320, randomly select 1004 one of the available redundancy versions 320 from the list, and notify 1006 the UE 314 about the selection.

Figure 11:
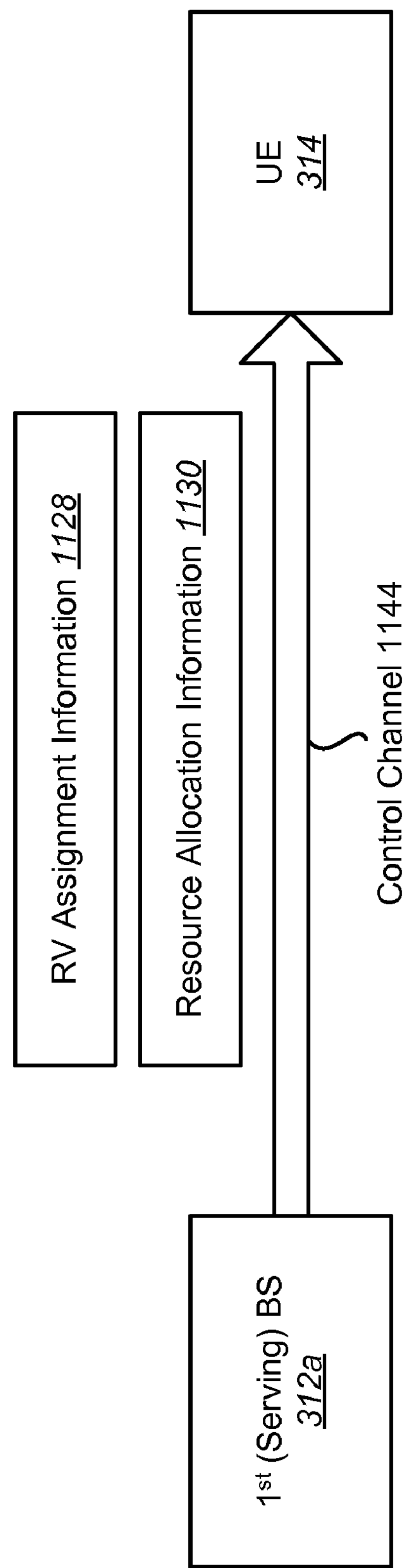
FIG. 11 illustrates a serving base station sending redundancy version assignment information and resource allocation information to a UE via a control channel.

Reference is now made to FIG. 11. The serving base station 312*a* may notify the UE 314 about the redundancy versions 320 and the resources that are being utilized by the cooperating base stations 312*a*, 312*b*, 312*c*. This notification may occur via signaling over a control channel 1144 (e.g., the Physical Downlink Control Channel, or PDCCH). FIG. 11 shows the serving base station 312*a* sending RV assignment information 1128 and resource allocation information 1130 to the UE 314 via the control channel 1144. When different spatial layers carry different redundancy versions 320 of the retransmitted packet 318, the serving base station 312*a* may signal to the UE 314 the redundancy versions 320 transmitted by each layer.

Alternatively, there could be an implicit layer-to-redundancy version mapping in the form of a lookup table. For example, the lookup table could specify that layer 1 uses rv_x and layer 2 uses rv_y, where rv_x and rv_y are different redundancy versions 320 used by spatial layers 1 and 2, respectively. The lookup table may be statically assigned (i.e., it may be fixed), or it can be semi-statically assigned during CoMP cell formation. More than 1 layer can be used to transmit one redundancy version 320.

Figure 12:
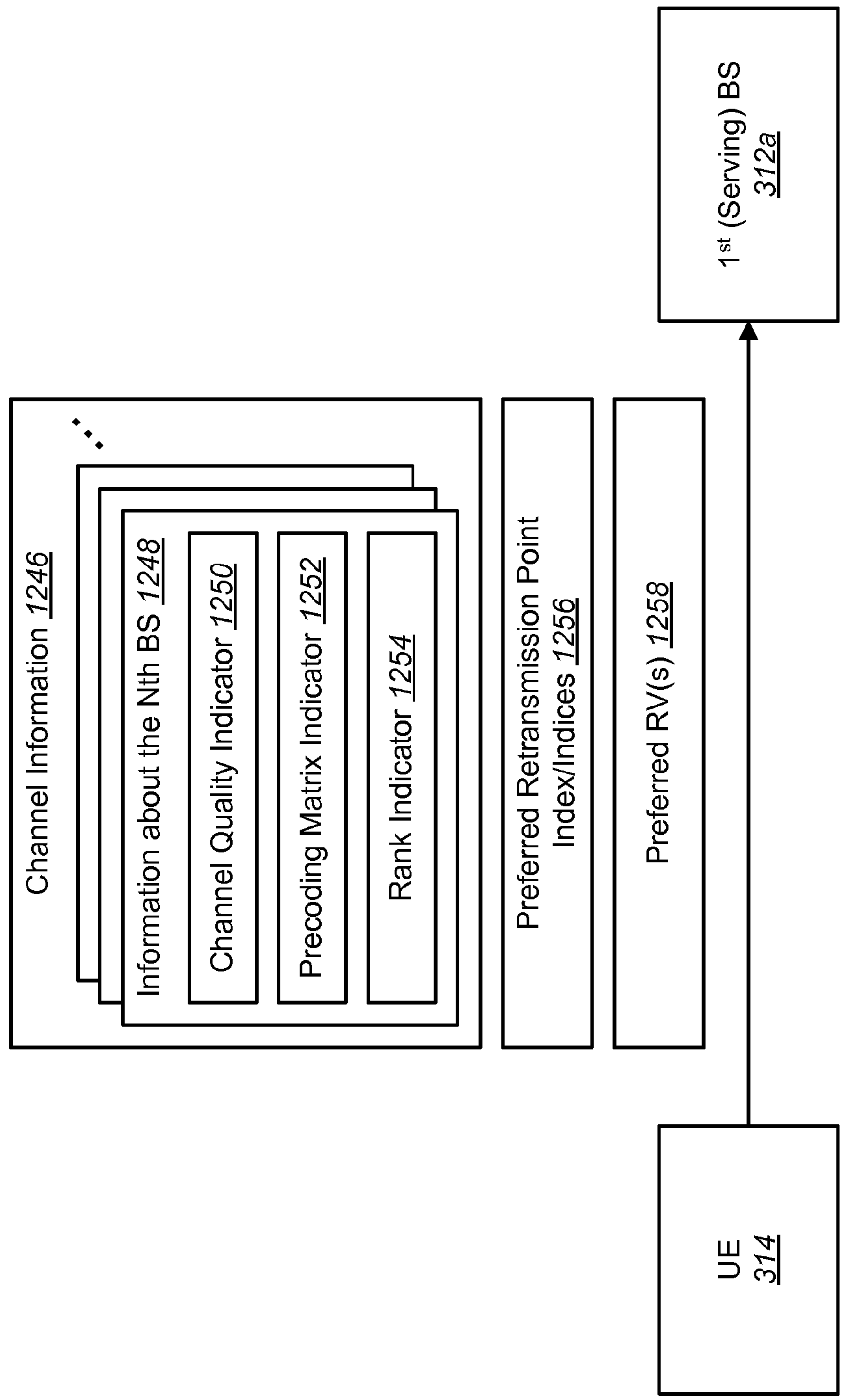
FIG. 12 illustrates a UE feeding back channel information to a serving base station.

Reference is now made to FIG. 12. Under some circumstances, the serving base station 312*a* may select a subset of participating base stations 312*a*, 312*b*, 312*c* to take part in retransmission. In order for the serving base station 312*a* to decide on which retransmission point(s) (e.g., which of the base stations 312*a*, 312*b*, 312*c*) and associated redundancy version(s) 320 to select for sending retransmission packets 318, the UE 314 can feed back the individual channels from the transmission point(s). FIG. 12 shows the UE 314 sending channel information 1246 back to the serving base station 312*a*. The channel information 1246 may include information 1248 for each base station 312. This information 1248 may include an individual channel quality indicator 1250, a preceding matrix indicator 1252 and a rank indicator 1254. The feedback could also combine the individual reports into a joint report corresponding to the combined channel quality indicator, preceding matrix indicator and rank indicator of the combined channel.

Furthermore, the UE 314 can also feedback the preferred retransmission point index 1256 (or indices if more than one is fed back) and preferred redundancy version 1258 to be used, and the serving base station 312*a* can select a subset of retransmission point(s) (e.g., select a subset of the cooperating base stations 312*a*, 312*b*, 312*c*) and redundancy version (s) 320 based on the UE's 314 preferences. The serving base station 312*a* may choose the retransmission point(s) 312 and redundancy version(s) 320 that have the highest probability of successful retransmission based on the feedback reports from the UE 314.

In addition to the ordering techniques described above, another possible ordering technique may involve the serving base station 312*a* deciding and announcing the ordering in a time varying manner. To facilitate this type of ordering technique, an ordering table may be transmitted a priori to all participating base stations 312*a*, 312*b*, 312*c*.

In the above discussion, it has been assumed that retransmission packets 318 are being sent by multiple cooperating base stations 312. However, the scope of the methods disclosed herein should not be limited in this regard. Retransmission packets 318 may be sent by transmission points other than cooperating base stations 312 (e.g., relays, remote radio equipment, etc.). The methods disclosed herein may be utilized in connection with any type of transmission point.

Techniques described above in connection with downlink CoMP can be applied to a system that includes multiple transmit antennas. A cooperative multipoint system can be viewed as a distributed multiple antenna system. Therefore, in an integrated system in which all the transmit antennas are in one location, the same techniques can be applied. In a system with multiple antennas, packets with different redundancy versions 320 may be transmitted on different layers.

The above discussion has focused primarily on the retransmission packets 318*a*, 318*b*, 318*c* that may be sent by cooperating base stations 312*a*, 312*b*, 312*c*. However, the scope of the present disclosure should not be limited in this regard. The methods disclosed herein may also be applied to the original transmission as well.

Figure 13:
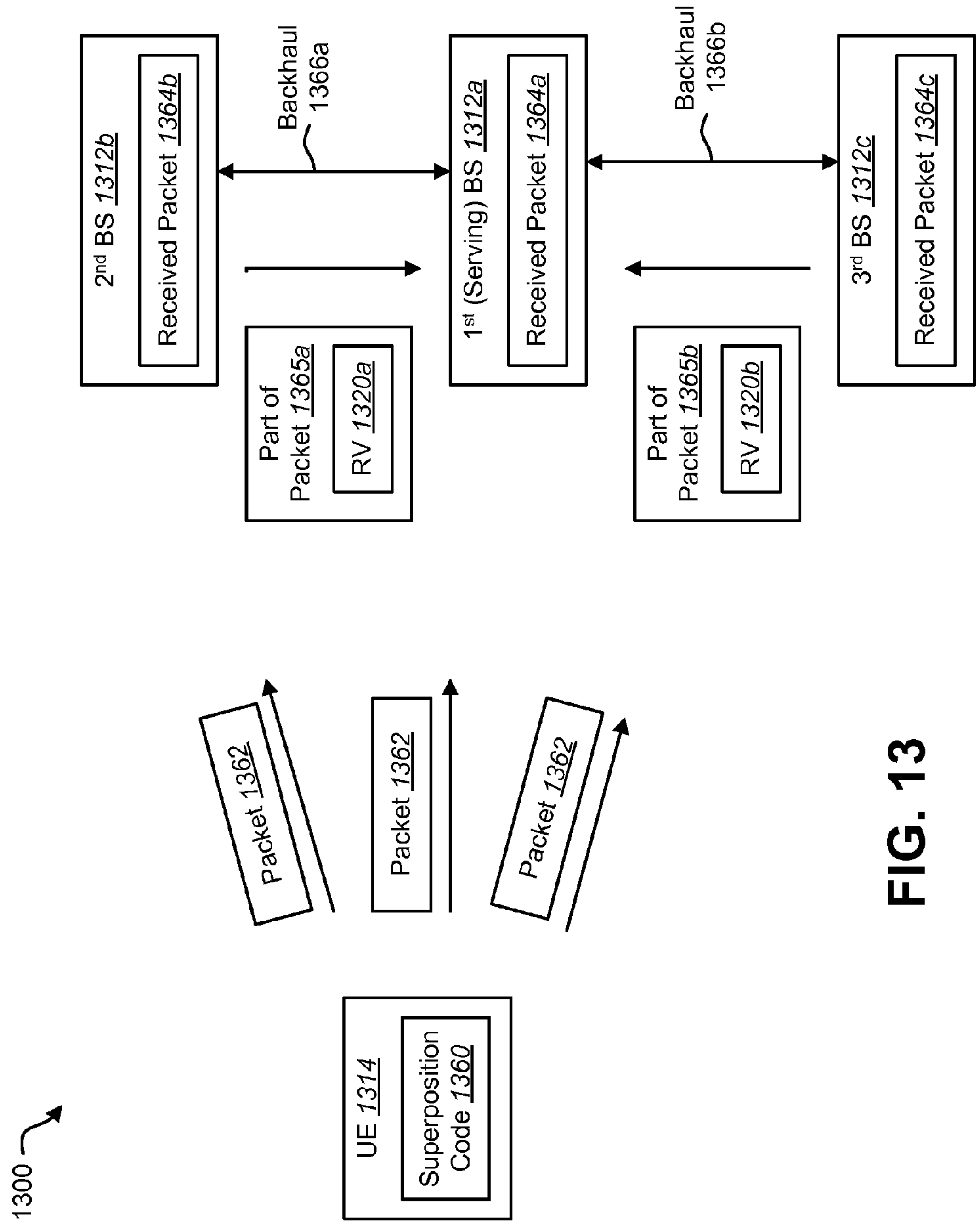
FIG. 13 illustrates a method for retransmission of information in a system in which uplink CoMP is being implemented.

Reference is now made to FIG. 13, which illustrates another system 1300 in which at least some of the methods disclosed herein may be utilized. The system 1300 shown in FIG. 13 relates to uplink CoMP. For uplink CoMP, multiple base stations 1312*a*, 1312*b*, 1312*c* receive a UE's 1314 transmission of a packet 1362, and they cooperatively attempt to decode the packet 1362. The same packet 1362 can be sent to all of the cooperating base stations 1312*a*, 1312*b*, 1312*c*. If the serving base station 1312*a* is not able to decode its received packet 1364*a*, then other base stations 1312*b*, 1312*c* may send their received packets 1364*b*, 1364*c*, or parts thereof, to the serving base station 1312*a*. Such transmission normally takes place via an X2 interface (a backhaul connection 1366) between two base stations 1312. However, transmissions via a backhaul connection 1366 are costly and should be minimized.

Figure 14:
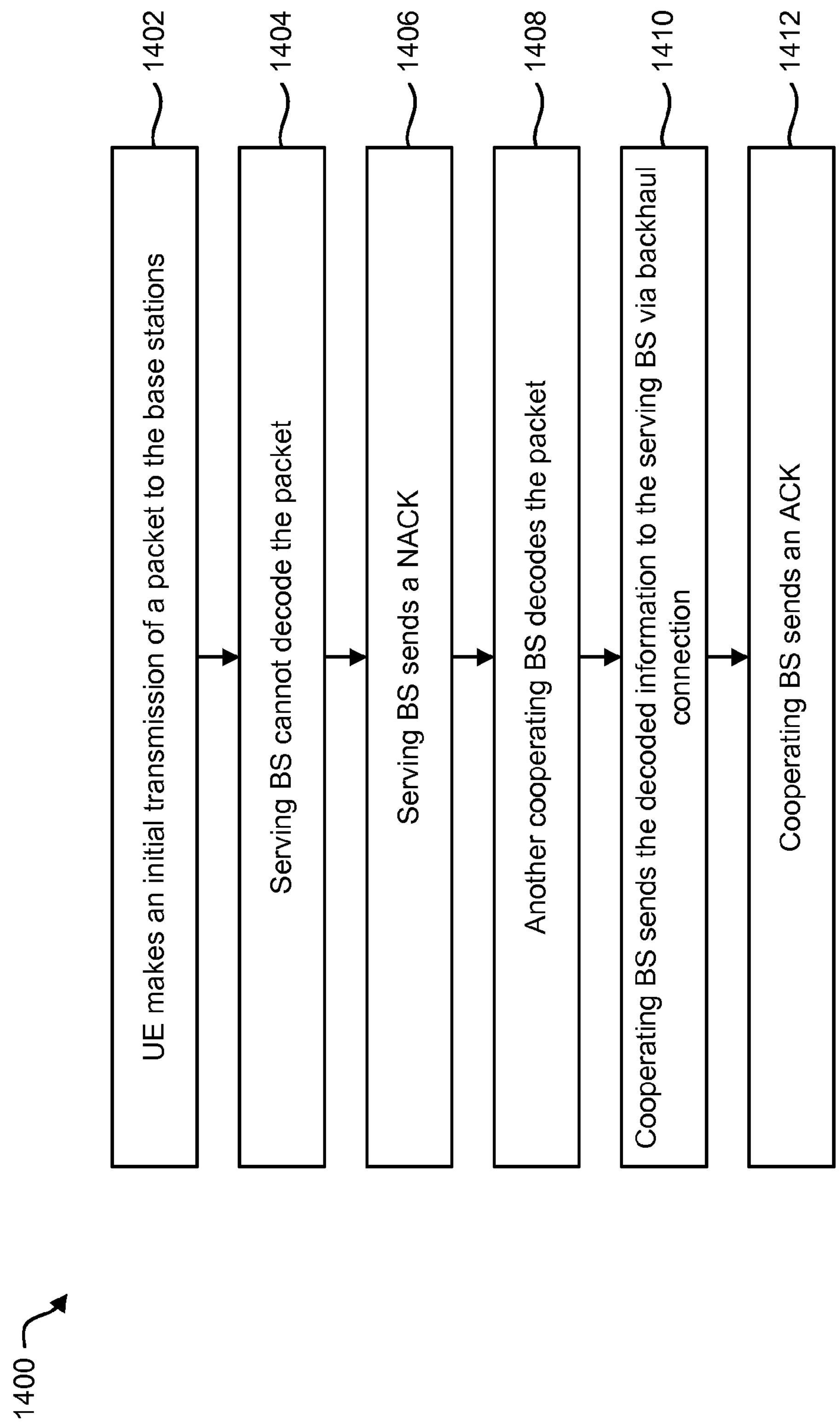
FIG. 14 illustrates a method that may be performed by the multiple cooperating base stations and the UE in the system of FIG. 13.

Reference is now made to FIG. 14. A UE 1314 may make 1402 an initial transmission of a packet 1362 to multiple cooperating base stations 1312*a*, 1312*b*, 1312*c*. If the serving base station 1312*a* is unable to decode 1404 its received packet 1364*a*, then the serving base station 1312*a* may send 1406 a NACK. However, if another cooperating base station 1312*b*, 1312*c* is able to decode 1408 its received packet 1364*b*, 1364*c*, then this cooperating base station 1312*b*, 1312*c* may send 1410 the decoded information to the serving base station 1312*a* via a backhaul connection 1366*a*, 1366*b*. The cooperating base station 1312*b*, 1312*c* may then send 1412 an ACK.

Figure 15:
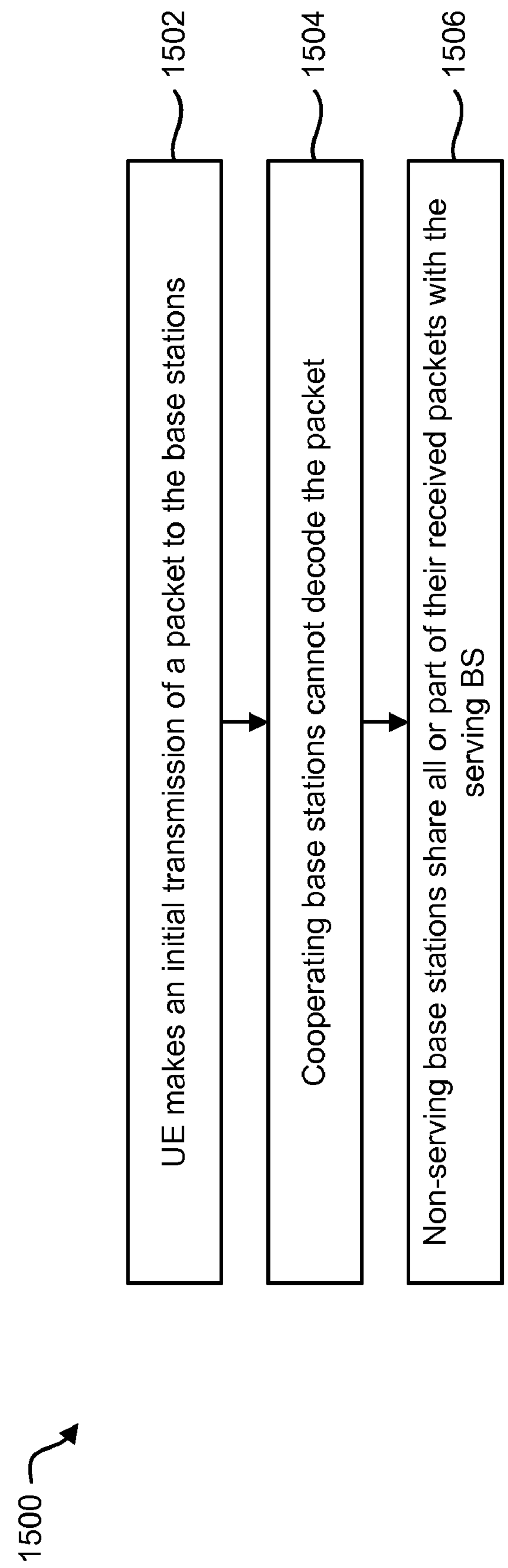
FIG. 15 illustrates another method that may be performed by the multiple cooperating base stations and the UE in the system of FIG. 13.

Reference is now made to FIG. 15. A UE 1314 may make 1502 an initial transmission of a packet 1362 to multiple cooperating base stations 1312*a*, 1312*b*, 1312*c*. If the cooperating base stations 1312*a*, 1312*b*, 1312*c* are unable to decode 1504 their received packets 1364*a*, 1364*b*, 1364*c* (e.g., they did not receive the transmitted packet 1362 correctly), then the non-serving base stations 1312*b*, 1312*c* may share 1506 all or part of their received packets 1364*b*, 1364*c* with the serving base station 1312*a*. For example, the second base station 1312*b* may send part 1365*a* of its received packet 1364*b* (e.g., the first half of its received packet 1364*b*), with a given redundancy version 1320*a*, to the serving base station 1312*a* via a first backhaul connection 1366*a*. Similarly, the third base station 1312*c* may send part 1365*b* of its received packet 1364*c* (e.g., the second half of its received packet

1364*c*), with the same or a different redundancy version 1320*b*, to the serving base station 1312*a* via a second backhaul connection 1366*b*.

The ordering by which the received packets 1364*a*, 1364*b*, 1364*c* are partitioned, as well as the partition assignment, can be performed using the ordering techniques explained above in connection with downlink CoMP (i.e., the techniques explained above in connection with FIGS. 5-12). Also, the fraction of the received packet 1364 that is sent by a particular base station 1312 may be parameterized.

The initial transmission of the packet 1362 may use superposition codes 1360. In other words, additional information can be encoded using superposition coding 1360 such that base stations 1312 with better channel quality may receive more parity bits, and hence they may use different redundancy versions for their retransmission. Different retransmission packets with different redundancy versions can be transmitted to different cooperating base stations 1312*a*, 1312*b*, 1312*c* using spatial degrees of freedom.

The above discussion related to uplink CoMP has focused on multiple cooperating base stations 1312. However, the scope of the methods disclosed herein should not be limited in this regard. The methods related to uplink CoMP that are disclosed herein may involve transmission points other than cooperating base stations. The methods disclosed herein may be utilized in connection with any type of reception point.

Figure 16:
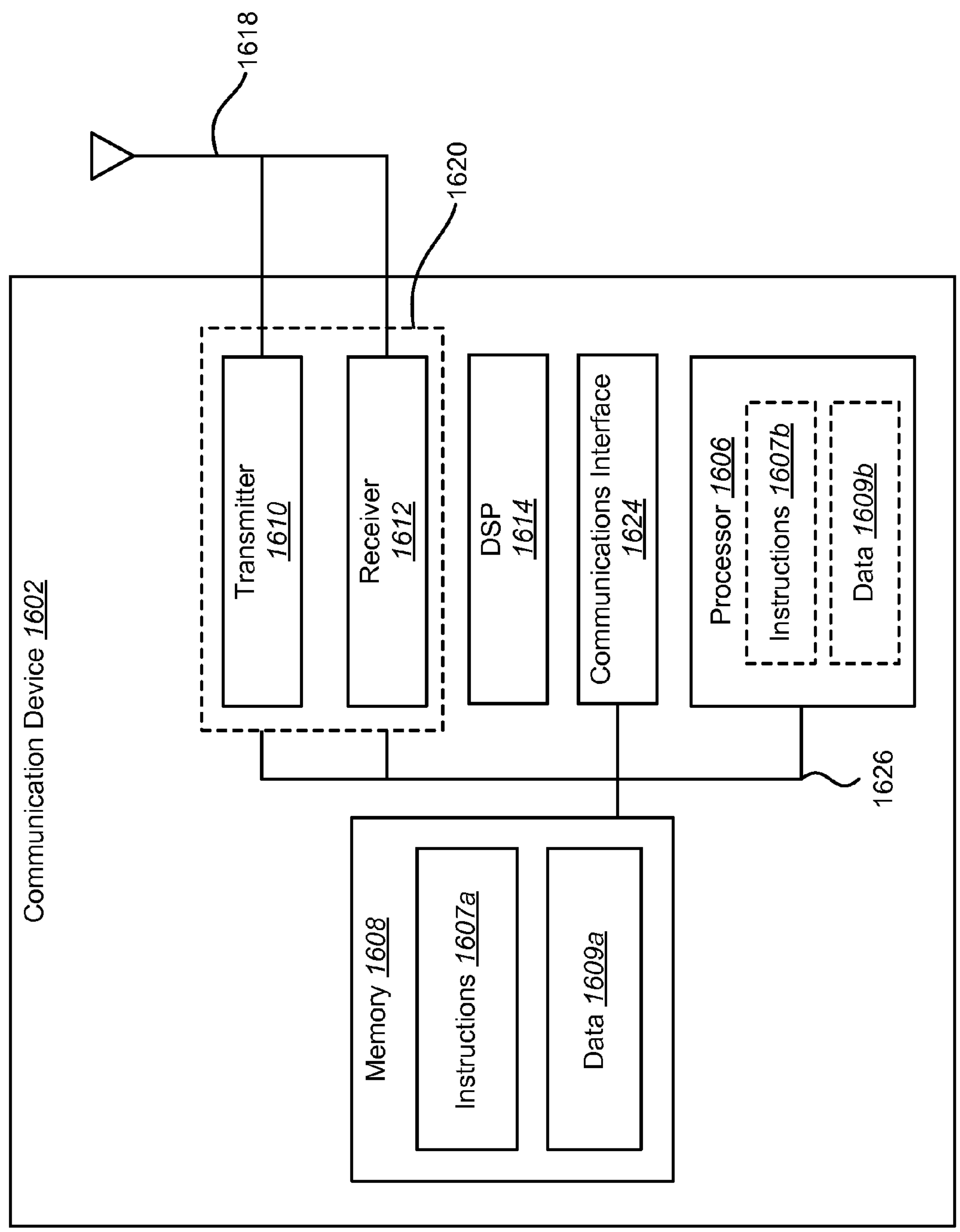
FIG. 16 illustrates various components that may be utilized in a communication device.

FIG. 16 illustrates various components that may be utilized in a communication device 1602. The communication device 1602 may be a UE or a base station. The communication device 1602 includes a processor 1606 that controls operation of the communication device 1602. The processor 1606 may also be referred to as a CPU. Memory 1608, which may include both read-only memory (ROM), random access memory (RAM) or any type of device that may store information, provides instructions 1607*a* and data 1609*a* to the processor 1606. A portion of the memory 1608 may also include non-volatile random access memory (NVRAM). Instructions 1607*b* and data 1609*b* may also reside in the processor 1606. Instructions 1607*b* loaded into the processor 1606 may also include instructions 1607*a* from memory 1608 that were loaded for execution by the processor 1606. The instructions 1607 may be executed by the processor 1606 to implement the methods disclosed herein.

The communication device 1602 may also include a housing that contains a transmitter 1610 and a receiver 1612 to allow transmission and reception of data. The transmitter 1610 and receiver 1612 may be combined into a transceiver 1620. An antenna 1618 is attached to the housing and electrically coupled to the transceiver 1620. Additional antennas may also be used.

The various components of the communication device 1602 are coupled together by a bus system 1626 which may include a power bus, a control signal bus, and a status signal bus, in addition to a data bus. However, for the sake of clarity, the various buses are illustrated in FIG. 16 as the bus system 1626. The communication device 1602 may also include a digital signal processor (DSP) 1614 for use in processing signals. The communication device 1602 may also include a communications interface 1624 that provides user access to the functions of the communication device 1602. The communication device 1602 illustrated in FIG. 16 is a functional block diagram rather than a listing of specific components.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory may be integral to a processor and still be said to be in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for retransmission of information, comprising:

sending, on at least two transmission points that are participating in downlink coordinated multiple point transmission, a first redundancy version of a retransmission packet to a user equipment on a first degree of freedom, wherein the first degree of freedom is different than at least one other degree of freedom on which at least one other redundancy version of the retransmission packet is sent to the user equipment.

2. The method of claim 1, wherein different degrees of freedom are obtained from at least one of time, frequency, spatial layers, and codes.

3. The method of claim 1, wherein different transmission points transmit using different degrees of freedom.

4. The method of claim 1, wherein at least one degree of freedom is used for transmission by different transmission points.

5. The method of claim 1, wherein the method is implemented by a serving base station, and further comprising indicating to at least one other transmission point which redundancy version parameters should be transmitted and which resource allocation blocks should be used via signaling messages.

6. The method of claim 5, wherein the signaling messages are control signaling messages that are exchanged between the serving base station and the at least one other transmission point on a dynamic basis.

7. The method of claim 5, wherein the signaling messages are higher layer signaling messages that are exchanged between the serving base station and the at least one other transmission point during initial setup of coordinated multi-point communication.

8. The method of claim 5, wherein the indication of which redundancy version parameters should be transmitted and which resource allocation blocks should be used occurs at the time of retransmission.

9. The method of claim 5, wherein the indication of which redundancy version parameters should be transmitted and which resource allocation blocks should be used occurs in a time varying manner.

10. The method of claim 1, further comprising determining the redundancy version parameters that should be transmitted using implicit information.

11. The method of claim 1, wherein the method is implemented by a serving base station, and further comprising selecting a subset of transmission points that are participating in coordinated multi-point communication to take part in retransmission.

12. The method of claim 1, wherein the method is implemented by a plurality of transmission points that comprise multiple antennas, where the plurality of transmission points are co-located, wherein the first redundancy version is transmitted on a different spatial layer than the at least one other redundancy version, and wherein the layer-to-redundancy version mapping is statically assigned.

13. The method of claim 1, wherein the method is implemented by a transmission point that comprises multiple antennas, wherein the first redundancy version is transmitted on a different spatial layer than the at least one other redundancy version, and wherein a layer-to-redundancy version mapping is semi-statically assigned during initial setup of coordinated multi-point communication.

14. The method of claim 1, wherein the first redundancy version is transmitted on a different spatial layer than the at least one other redundancy version, and further comprising signaling to the user equipment which spatial layer is transmitting which of the first redundancy version and the at least one other redundancy version.

15. The method of claim 1, wherein a number of transmission points that are participating in coordinated multi-point communication exceeds a number of spatial layers, and further comprising selecting the first redundancy version and the at least one other redundancy version using k mod L, wherein k is a transmission point's ranking and L is a number of available spatial layers.

16. The method of claim 1, further comprising notifying the user equipment about redundancy versions and resources that are being used via a downlink control channel.

17. The method of claim 1, wherein the method is implemented by a serving base station, and further comprising:

receiving feedback reports from the user equipment; and choosing transmission points and redundancy versions that have the highest probability of successful retransmission based on the feedback reports.

18. The method of claim 17, wherein the feedback reports comprise the user equipment's preferences regarding the transmission points and the redundancy versions.

19. The method of claim 1, further comprising sending a first redundancy version of an original transmission packet to the user equipment on a different degree of freedom than at least one other redundancy version of the original transmission packet.

20. A method for retransmission of information for uplink cooperative multi-point communication, the method being implemented by a serving base station, the method comprising:

receiving a packet from a user equipment;

determining that the serving base station is unable to decode the packet;

receiving a first part of the packet from a first cooperating base station via a first backhaul connection; and receiving a second part of the packet from a second cooperating reception point via a second backhaul connection.

21. The method of claim 20, wherein the first part of the packet has the same redundancy version as the second part of the packet.

22. The method of claim 20, wherein the first part of the packet has a different redundancy version than the second part of the packet.

23. A method for transmission of information for uplink cooperative multi-point communication, comprising:

transmitting a packet to each of multiple cooperating reception points; and transmitting different retransmission packets with different redundancy versions to different cooperating reception points using spatial degrees of freedom.

24. The method of claim 23, further comprising encoding additional information using superposition coding such that a reception point with a better channel can access additional parity bits.

25. The method of claim 23, wherein the method is implemented by a user equipment, and wherein the multiple cooperating reception points are base stations.

26. A transmission point that is configured for retransmission of information, comprising:

a processor;

memory in electronic communication with the processor;

instructions stored in memory, the instructions being executable to:

send a first redundancy version of a retransmission packet to a user equipment on a first degree of freedom, wherein the first degree of freedom is different than at least one other degree of freedom on which at least one other redundancy version of the retransmission packet is sent to the user equipment, wherein the transmission point is participating in downlink coordinated multiple point transmission.

27. The transmission point of claim 26, wherein different degrees of freedom are obtained from at least one of time, frequency, spatial layers, and codes.

28. The transmission point of claim 26, wherein different degrees of freedom are obtained from different transmission points.

29. The transmission point of claim 26, wherein at least one degree of freedom combines resources of different transmission points.

30. A serving base station that is configured for retransmission of information for uplink cooperative multi-point communication, comprising:

a processor;

memory in electronic communication with the processor;

instructions stored in memory, the instructions being executable to:

receive a packet from a user equipment;

determine that the serving base station is unable to decode the packet;

receive a first part of the packet from a first cooperating base station via a first backhaul connection; and receive a second part of the packet from a second cooperating reception point via a second backhaul connection.

31. The serving base station of claim 30, wherein the first part of the packet has the same redundancy version as the second part of the packet.

32. The serving base station of claim 30, wherein the first part of the packet has a different redundancy version than the second part of the packet.

33. An apparatus for transmission of information for uplink cooperative multi-point communication, comprising:

a processor;

memory in electronic communication with the processor;

instructions stored in memory, the instructions being executable to:

transmit a packet to each of multiple cooperating reception points; and transmit different retransmission packets with different redundancy versions to different cooperating reception points using spatial degrees of freedom.

34. The apparatus of claim 33, wherein the instructions are also executable to encode additional information using superposition coding such that a reception point with a better channel can access additional parity bits.

35. The apparatus of claim 33, wherein the apparatus is a user equipment, and wherein the multiple cooperating reception points are base stations.

* * * * *

UNITED STATES PATENT AND TRADEMARK OFFICE

CERTIFICATE OF CORRECTION

PATENT NO. : 8,386,876 B2
APPLICATION NO. : 12/541847
DATED : February 26, 2013
INVENTOR(S) : Ahmad Khoshnevis et al.

It is certified that error appears in the above-identified patent and that said Letters Patent is hereby corrected as shown below:

In the Specification

In column 5, line 43 please delete "(preceding) vector" and replace it with --(precoding) vector--.

In column 9, line 48 please delete "preceding matrix" and replace it with --precoding matrix--.

In column 9, line 51 please delete "indicator, preceding" and replace it with --indicator, precoding--.

Signed and Sealed this
Twelfth Day of November, 2013

Teresa Stanek Rea
*Deputy Director of the United States Patent and Trademark Office*